US011623630B2

(12) United States Patent
Peng

(10) Patent No.: US 11,623,630 B2
(45) Date of Patent: Apr. 11, 2023

(54) SYSTEM AND METHOD FOR DRIVING ADJUSTMENT BASED ON TRAILER POSE DETECTION

(71) Applicant: Inceptio Technology, Inc., Fremont, CA (US)

(72) Inventor: Chenyu Peng, Fremont, CA (US)

(73) Assignee: Inceptio HONGKONG Limited, Kowloon (HK)

( * ) Notice: Subject to any disclaimer, the term of this patent is extended or adjusted under 35 U.S.C. 154(b) by 145 days.

(21) Appl. No.: 17/007,609

(22) Filed: Aug. 31, 2020

(65) Prior Publication Data

US 2022/0063582 A1 Mar. 3, 2022

(51) Int. Cl.

| B60W 10/20 | (2006.01) |
|---|---|
| G01S 17/931 | (2020.01) |
| B60W 30/18 | (2012.01) |
| B62D 13/06 | (2006.01) |

(52) U.S. Cl.
CPC ...... B60W 10/20 (2013.01); B60W 30/18145 (2013.01); G01S 17/931 (2020.01); *B60W 2420/52* (2013.01); *B60W 2422/95* (2013.01); *B60W 2520/22* (2013.01); *B60W 2530/205* (2020.02); *B62D 13/06* (2013.01)

(58) Field of Classification Search
CPC ........... B60W 10/20; B60W 30/18145; B60W 2530/205; B60W 2420/52; B60W 2422/95; B60W 2520/22; G01S 17/931; B62D 13/06
See application file for complete search history.

(56) References Cited

U.S. PATENT DOCUMENTS

| 2015/0066296 | A1* | 3/2015 | Trombley | B62D 13/06 701/41 |
|---|---|---|---|---|
| 2015/0344029 | A1* | 12/2015 | Silvlin | B62D 15/025 701/36 |
| 2019/0217888 | A1* | 7/2019 | Perry | B62D 13/06 |
| 2020/0017143 | A1* | 1/2020 | Gali | G06T 7/70 |
| 2020/0183008 | A1* | 6/2020 | Chen | B60W 10/20 |

* cited by examiner

*Primary Examiner* — Dale W Hilgendorf
*Assistant Examiner* — Hana Lee

(57) ABSTRACT

A system may comprise one or more processors, and a memory storing instructions that, when executed by the one or more processors, causing the system to perform receiving, from a first sensor coupled to a front part of a vehicle, a first set of sensor data that include data of a first edge of a body part, or from a second sensor coupled to the front part of the vehicle, a second set of sensor data that include data of a second edge of the body part. The system may perform calculating, based on the first or second set of the sensor data, location of the first edge or the second edge of the body part relative to the front part, and determining whether the relative location of the first edge or the second edge is within an expected location range. The system may perform sending a notification that driving adjustment of the vehicle is required if the relative location is outside the expected location range.

20 Claims, 9 Drawing Sheets

SYSTEM AND METHOD FOR DRIVING ADJUSTMENT BASED ON TRAILER POSE DETECTION

BACKGROUND

A particular challenge for driving a truck or a vehicle towing a trailer is to make sure that the trailer, which can be fairly long or loosely connected to the vehicle, follows the vehicle and does not sway out of track. A sudden gust, a passing truck or a quick steering correction can start a trailer swaying or fishtailing, potentially causing a loss of control if not corrected properly. In some instances, when the vehicle is making a turn, a miscalculation by the driver may end up with the trailer hitting a nearby object. Even if the turn is properly made, an unsavvy driver of a nearby vehicle may nonetheless run into the trailer due to the lack of knowledge on how much space it takes for a long vehicle to make a turn, or how a trailer would move during a turn.

Yet another challenge, referred to as jackknifing, is presented when the vehicle is backed up with the trailer. It is a situation where the angle between the vehicle and the trailer it is pulling is less than 90 degrees, or beyond an L shape to a V shape. Truck drivers rely on their experience and their viewing of the trailers from the rearview mirrors to adjust driving to ensure that the trailer is at where it is expected. Autonomous vehicles, however, do not have the benefit of an experienced truck driver. Accordingly, different solutions are required to deal with these challenges.

SUMMARY

Described herein include trailer pose detection systems which provide location and position information about a trailer to assist driving control, including driving adjustment of a vehicle. In some embodiments, the systems implement a process that entails receiving, from a first sensor coupled to a front part of a vehicle, a first set of sensor data that include data of a first edge of a body part of the vehicle, or from a second sensor coupled to the front part of the vehicle, a second set of sensor data that include data of a second edge of the body part; calculating, based on the first or second set of the sensor data, location of the first edge or the second edge of the body part relative to the front part; determining whether the relative location of the first edge or the second edge is within an expected location range; and sending a notification that driving adjustment of the vehicle is required if the relative location is outside the expected location range.

In some embodiments, the first or second set of the sensor data may be processed to remove at least part of data corresponding to objects above the first or second edge of the body part. In some embodiments, the first or second set of sensor data may be processed to remove at least part of data corresponding to objects below the first or second edge of the body part.

In some embodiments, the first or second set of the sensor data may be processed to remove at least part of data corresponding to objects outside a range of possible relative locations of the first or second edge. In some embodiments, the system may be configured to detect and record relative locations of the first and second edges. In some embodiments, the record may be maintained until the body part is detached from the front part. In some embodiments, the range of possible relative locations may be provided in data source that identifies the range based on a make or model number of the body part.

In some embodiments, the system may be configured to filter the sensor data corresponding to objects other than the first edge or the second edge of the body part.

In some embodiments, the first sensor may be disposed on a left side of the front part and the second sensor may be disposed on a right side of the front part. In some embodiments, the system may be configured to not receive or analyze the second set of sensor data when the vehicle is making a left turn, or not receive or analyze the first set of sensor data when the vehicle is making a right turn.

In some embodiments, the system may be configured to detect and object that may collide with the body part of the vehicle. In some embodiments, the system may be configured to send a command to a driving control module of the vehicle to adjust driving to avoid the collision.

In some embodiments, the first sensor and the second sensor each may be a LiDAR.

Various embodiments of the present disclosure provide a method for edge detection and driving adjustment. The method may comprise: receiving, from a first sensor coupled to a front part of a vehicle, a first set of sensor data that include data of a first edge of a body part of the vehicle, or from a second sensor coupled to the front part of the vehicle, a second set of sensor data that include data of a second edge of the body part; calculating, based on the first or second set of the sensor data, location of the first edge or the second edge of the body part relative to the front part; determining whether the relative location of the first edge or the second edge is within an expected location range; and sending a notification that driving adjustment of the vehicle is required if the relative location is outside the expected location range. In some embodiments, the first sensor and the second sensor each may be a LiDAR.

In some embodiments, the method may comprise removing at least part of data corresponding to objects above the first edge or the second edge of the body part; and removing at least part of data corresponding to objects below the first edge or the second edge of the body part.

In some embodiments, the method may comprise filtering the sensor data corresponding to objects other than the first edge or the second edge of the body part.

In some embodiments, the method may comprise detecting one or more objects that may collide with the body part of the vehicle. In some embodiments, the method may further comprise sending a command to a driving control module of the vehicle to adjust driving to avoid the collision.

In some embodiments, the first sensor may be disposed on a left side of the front part and the second sensor may be disposed on a right side of the front part. The system may comprise filtering the second set of sensor data when the vehicle is making a left turn, or filtering the first set of sensor data when the vehicle is making a right turn.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
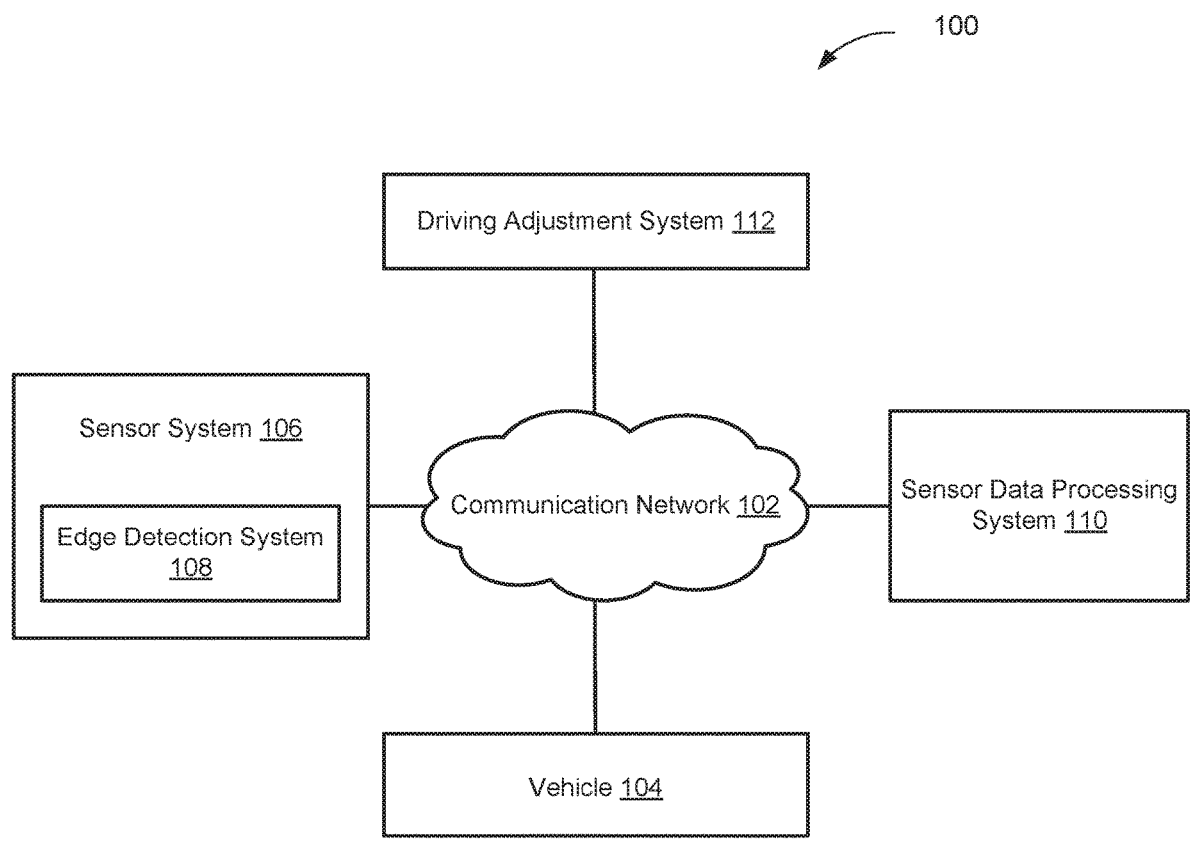
FIG. 1 depicts a diagram of an example for driving adjustment of a vehicle, in accordance with some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Systems and methods are provided to collect location and/or position information of a trailer coupled to a vehicle (e.g., truck), which information is then used to determine whether driving adjustment is needed. The location and/or position of the trailer, for instance, can be detected by one or more sensors on the vehicle. Such sensors may be already installed on the vehicle for other purposes, such as for autonomous driving.

In a preferred implementation, at least two sensors are placed on the vehicle, one of which is placed to the left and the other to the right. The sensor on the left is better positioned to detect a rear edge of the trailer on the left, and the sensor on the right is better positioned to detect a rear edge on the right. It can be readily appreciated that not both sensors have to be used in all situations. For instance, when the sensor on the right detects the edge on the right swaying to the right, there is no need for the sensor on the left to continue the detection. On the other hand, if the sensor on the right fails to see an edge, there is still a need for the sensor on the left to check the location of the edge on the left.

There are various different types of sensors available for the trailer detection. Some examples include still cameras, video cameras, radar, LiDAR, sonar sensors, ultrasonic sensors, and infrared sensors, without limitation. In a preferred implementation, the sensor is a LiDAR sensor.

Trailer detection does not have to occur at all times, or at the same frequency at all times. For instance, when a truck is moving on the fairly straight and flat highway, unless a sudden movement is detected (e.g., earthquake), no trailer detection is required. Alternatively, trailer detection can still be carried out in such a situation, but at a lower frequency. In another example, when a truck is making a left turn, the system (trailer detection system, the driving system, or a control system in the vehicle) can be informed of such a turn or learn of the turn, and consequently activate the trailer detection from the sensor on the left, but not the sensor on the right.

When the trailer detection is in action, in some implementations, the detection can be optimized by filtering less useful or not useful sensor data before the data is processed. For instance, when a LiDAR is used to detect an edge of the trailer, any data collected by the LiDAR that corresponds to space above the trailer (e.g., sky) or below the trailer (e.g., ground) can be removed during pre-processing, greatly reducing the amount of data to be analyzed.

In some implementations, historic or profile data can be used to pre-process or process the sensor data. For instance, a truck may be attached to different trailers of different sizes. When a new trailer is attached, through one or more rounds of trailer edge detection, the system will learn of the size of the trailer. Accordingly, a range of locations for each edge can be calculated. When detecting the edge, such a range can be used to remove data not useful for the analysis, and/or validate or reject edge detection. In some instances, when a trailer is attached electrically, the profile information of the trailer may be fed into the driving control system, which can also help with sensor data processing.

In some implementations, the sensors can also collection information about objects in close proximity to the trailer, in particular objects moving towards the trailer. In some implementations, in addition to location of one or both edges of the trailer, the sensors can also detect position (e.g., orientation) of the edges or the trailer. This can be helpful in particular when the trailer is moving on an uneven surface.

As noted, trailer detection can be used for driving adjustment. Depending on the risk predicted from the trailer detection (e.g., hitting an object, unsafe for cargo carried in the trailer), appropriate adjustments can be made. Examples include reducing the speed, stopping, turning further or less to the right or the left, without limitation. Details of each of these implementations are further described below.

In various implementations, the system and the computer-implemented method may receive sensor data of an edge of the vehicle's trailer captured by sensors installed at the tractor of the vehicle. The system may calculate location of the trailer's edge relative to the tractor, and determine whether adjustment of the trailer is required. The adjustment is required when the relative location of the trailer's edge to the tractor is not in an expected location range. The expected location range may be a range of angle of deviation of the edge relative to the vehicle's driving direction. For example, if the expected location range of a trailer's edge is between 0 degree to 10 degree, the system may adjust the trailer when the angle of deviation of the edge is determined to be 15 degree.

Some embodiments provide systems and methods for analyzing an expected location range based on a trailer's model or make. When a trailer is attached to a tractor, the system may determine an expected location range based on the trailer's size or model, and record the location of the trailer's edge until the trailer is detached from the tractor, or is replaced by a new trailer. In some embodiments, the system may filter data of irrelevant objects and analyze data of the edge of the trailer captured by the sensor (e.g. LiDAR). The irrelevant objects may be objects located below the bottom of the trailer, above the top of the trailer, or outside a field of interest surrounding the edge of the trailer.

In the example illustrated in FIG. 1, the system 100 may include a vehicle (e.g., truck) 104, a sensor system 106, a sensor data processing system 110, a driving adjustment system 112, and a communication network 102. The sensor system 106 may include an edge detection system 108. In some embodiments, the systems 106, 110, 112 and the communication network 102 may be implemented as part of the vehicle 104. The vehicle 104 discussed herein may be vehicles that travel in the air (e.g., drones, helicopter, airplanes, and so on), travels on water (e.g., a boat), and/or the like. The vehicle discussed herein may accommodate one or more passengers therein. The vehicle discussed herein may have two parts (e.g. a truck or a vehicle with a trailer) that includes a front part (i.e., tractor) and a body part (i.e., trailer). The vehicle discussed herein may be autonomous vehicle, or semi-autonomous vehicle.

In some embodiments, the vehicle may control braking and/or acceleration without real time human input. In some embodiments, the autonomous vehicle may control steering without real time human input based on inputs from one or more lens mount units. In some embodiments, the autonomous vehicle may autonomously control braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous-driving vehicle, such as gear shifting, steering control, braking pedal control, accel pedal control, crutch pedal control, and so on.

The autonomous vehicle system 100 may be capable of sensing its environment based on inputs from one or more sensing devices (e.g., LiDAR) mounted on the autonomous vehicle system 100. In some embodiments, the system 100 may be configured to analyze data obtained from the one or more sensing devices and identify objects (e.g., traffic signals, road signs, other vehicles, pedestrians, and obstacles). In some embodiments, the system 100 may be capable of driving the vehicle so as to follow a traffic stream without hitting the identified objects. For example, the system 100 may adjust locations of a body part of the vehicle based on the sensor data, and avoid collision with surrounding objects.

The sensor system 106 may be mounted on one or more portions. The sensor system may be mounted on one or more portions (e.g., exterior surfaces, interior surfaces) of a vehicle, and may include a sensor, or one or more sensors. As used herein, sensors may include laser scanning systems (e.g., Lidar systems), radar systems, cameras, GPS, sonar, ultrasonic, IMU, and FIR (far infrared) sensors and/or the like. The sensor system may be configured to capture sensor data from one or more sensors installed at the front part of the vehicle. For example, a first set of sensor data may be obtained from a sensor installed at a left side of the front part of the vehicle, and a second set of sensor data may be obtained from a right side of the front part of the vehicle. The first or second set of the sensor data may be captured by different side sensors at a same time, a same sensor at different, sequential times, or different sensors at different, sequential times. Sequential may mean directly before or directly afterwards. The different sensors may be sensors of a same or a different modality. The sensor data may be further processed to obtain or estimate one or more parameters, and the like. The one or more parameters may include information of the sensor that may be compared with known parameters from manufacturer specifications. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like.

The edge detection system 108 may receive a first or a second set of sensor data that include data of an edge at the left side (i.e. left edge) or an edge at the right side (i.e. right edge) of the body part. The edge detection system 108 may calculate, based on the first or the second set of the sensor data, location of the left edge or the right edge of the body part relative to the front part. In some embodiments, the edge detection system 108 may determine whether the relative location of the edge of the body part is within an expected location range. If the edge detection system 108 determines that the relative location of the edge is not within the expected location range, the edge detection system 108 may send a request to adjust the body part of the vehicle. The expected location range of the edge may be a range of angle of deviation of the edge of the body part relative to the front part. For example, the expected range of the relative location may be between zero degree to 10 degree of the edge relative to the front part, or the front part's driving direction. As another example, the expected location range may be a turning curve predicted by the system when the vehicle is making a turn.

In some embodiments, the edge detection system 108 may record data of the edge of the body part and data within a field of interest of the edge. The edge detection system 108 may remove data of irrelevant objects outside field of interest. For example, the system may determine an adjustment threshold distance (e.g., 5 feet) from the edge. If a pedestrian is located at 8 feet away from the edge), the edge detection system 108 may determine the pedestrians is an irrelevant object and remove the data of the pedestrian.

The driving adjustment system 112 may be a module. In some embodiments, the driving adjustment system 112 may adjust a vehicle's driving direction based on the relative location of the edge of the body part. The driving adjustment system 112 may adjust the body part of the vehicle to be aligned with the front part of the vehicle, or adjust angle of deviation of the body part to zero degree relative to the vehicle's driving direction. In some embodiments, the driving adjustment system 112 may adjust driving actions based on objects within the adjustment threshold distance of the edge of the body part. In some embodiments, the driving adjustment system 112 may be configured to immediately adjust the body part if one or more objects are determined to be within a field of interest. If no object is detected to be surrounded in the field of interest, the system 112 may adjust the body part when in optimized environments (e.g., on a flat or straight road).

In some embodiments, the driving adjustment system 112 may be implemented as one or more programmable boards (e.g., programmable circuit boards) that are disposed logically and/or physically between the sensor system 106 and the sensor data processing system 110. For example, there may be one or more separate programmable boards for each type of sensor (e.g., a programmable board to filter camera sensor data, a programmable board to filter laser scanning system sensor data, a programmable board to filter ultrasonic sensor data, and/or the like), or there may be a single programmable board for all sensors.

The sensor data processing system 110 may function to process sensor data to sense an environment surrounding a vehicle and/or cause a vehicle to perform one or more vehicle driving actions such as autonomous driving actions (or, simply, "driving actions"). For example, the sensor data processing system 110 may process data captured at different times or from different sensor modalities to make the data compatible or suitable for comparison. In some embodiments, the sensor data processing system 110 may analyze sensor data to identify objects (e.g., traffic signals, road signs, other vehicles, pedestrians, and obstacles) in one or more regions surrounding the vehicle. The sensor data processing system 110 may process the historical data and/or the sensor data to separate any boundaries (such as between natural objects, for example, grass and road, sky and mountain, sky and ground). As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, acceleration pedal control, crutch pedal control, and so on. The sensor data processing system 110 may be implemented as a central computing system of an autonomous vehicle.

In some embodiments, the sensor data processing system 110 may include filtering functionality. For example, the data of the objects outside the field of interest may be filtered and not be processed in the sensor data processing system 110. In various embodiments, the sensor data processing system 110 may not include filtering functionality. This may allow, for example, the sensor data processing system 110 to be implemented using less powerful components (e.g., slower processors, less memory, and/or the like), and still achieve all of the functionality of a vehicle such as an AV. In various embodiments, the filtering functionality is provided separately (provided in the edge detect system 108$s$).

In the example of FIG. 1, the system 100 may be also capable of communicating with systems or devices connected to the system 100 through a network. In an embodiment, the system 100 communicates with a server via the network. For example, the system 100 may pull up from the server map information (e.g., local map, parking structure map, floor plan of buildings, and etc.) of a region around the autonomous vehicle. In another example, the system 100 periodically may notify information of the system 100 such as locations and directions thereof to the server.

Figure 2:
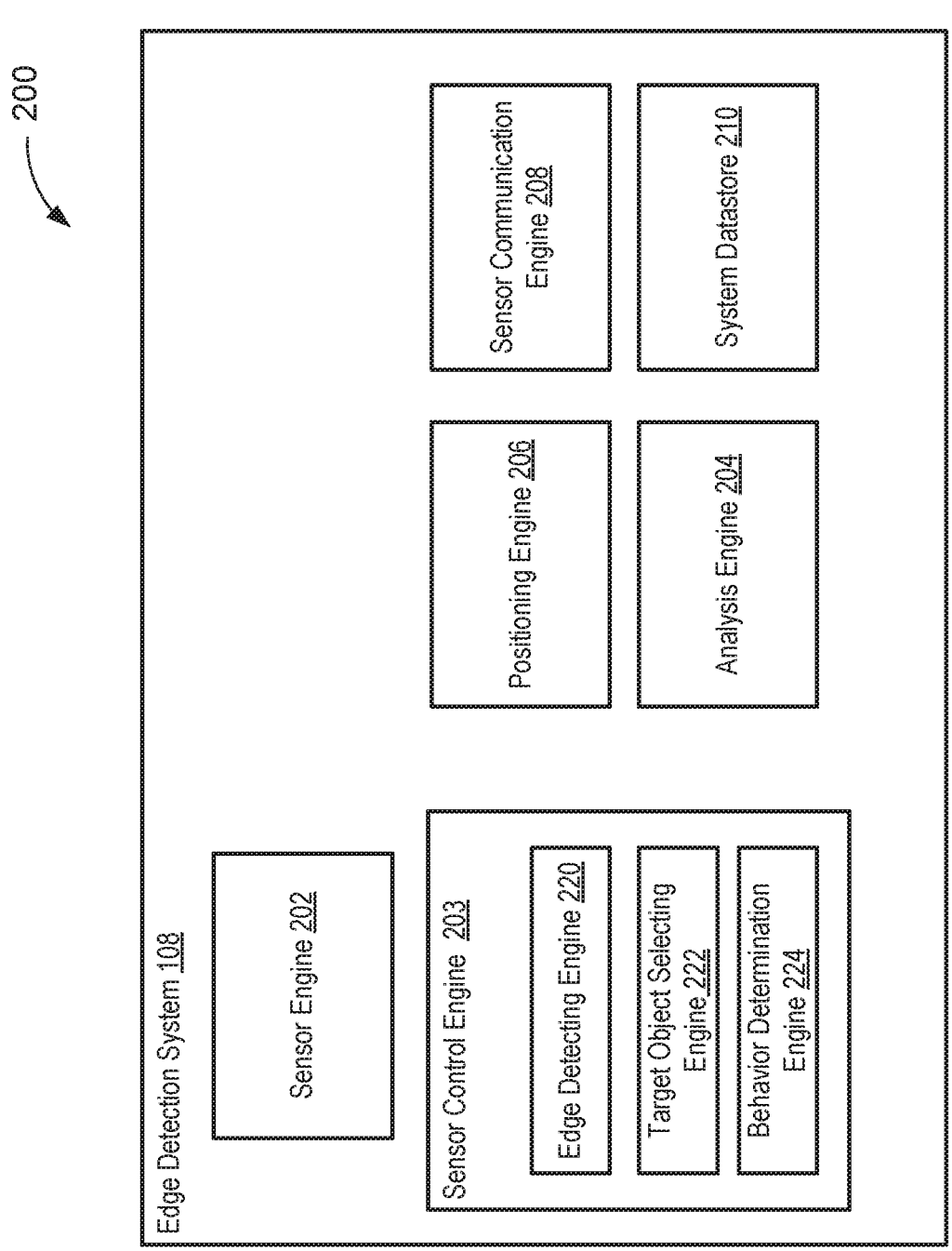
FIG. 2 depicts a diagram of an example of an edge detection system, in accordance with some embodiments.

The communications network 102 may represent one or more computer networks (e.g., LAN, WAN, bus, or the like) or other transmission mediums. The communication network 102 may provide communication between the vehicle 104, systems 106-110 and/or other systems/engines described herein. In some embodiments, the communication network 102 may include one or more computing devices, routers, cables, buses, and/or other network topologies (e.g., mesh, and the like). In some embodiments, the communication network 102 may be wired and/or wireless. In various embodiments, the communication network 102 may include the Internet, one or more wide area networks (WANs) or local area networks (LANs), one or more networks that may be public, private, IP-based, non-IP based, and so forth FIG. 2 illustrates a diagram of an example of an edge detection system 108, in accordance with some embodiments. In example of FIG. 2, the edge detection system 108 may include a sensor engine 202, a sensor control engine 203, an analysis engine 204, a positioning engine 206, a sensor communication engine 208, a sensor system datastore 210.

The sensor engine 202 may function to capture sensor data surrounding the vehicle. The sensor engine 202 may include one or more sensors. A sensor may be installed at a left side and/or a right side of the front part of the vehicle. The sensors may include laser scanning systems (e.g., LiDAR systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on), and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the vehicle such as the autonomous vehicle. In some embodiments, the system may include a 3D to 2D processing system. The 3D to 2D processing system may flatten 3D data captured by the sensor (e.g., LiDAR) to 2D image along z-axis. The reflected 2D image may be used to illustrate angle of deviation of the edge of the body part relative to the front part of the vehicle.

In the example depicted in FIG. 2, the sensor control engine 203 may be intended to represent specifically-purposed hardware and software configured to control overall operation of the autonomous vehicle system 100. For example, the sensor control engine 203 may control operations of the sensor data processing system 110, the analysis engine 204, and the positioning engine 206. The control engine 203 may include an edge detecting engine 220, a target object selecting engine 222, a behavior determination engine 224.

In some embodiments, the target object selecting engine 222 may determine relevant objects located within the field of interest. For example, the target edge selecting engine 222 may select a relevant object within an adjustment threshold distance (e.g., 5 feet) from the edge of the body part. As another example, the target edge selecting engine 222 may not select an object outside the adjustment threshold distance from the edge. In another example, the target object selecting engine 222 may determine objects above the top of the body part or below the bottom of the body part are irrelevant (i.e., irrelevant objects), and filter the irrelevant objects from the system.

Depending on a specific implementation and other consideration, the vehicle route or the driving adjustment may be determined by an applicable engine such as the behavior determination engine 224 as described below, and the target object selecting engine 222 may determine the adjustment of the body part of the vehicle.

In the example depicted in FIG. 2, the behavior determination engine 224 may be intended to represent specifically-purposed hardware and software configured to determine behavior of the autonomous vehicle system 100. Specifically, the behavior determination engine 224 may determine driving adjustment of a vehicle such as AV. In some embodiments, the vehicle adjustment may include adjusting deviated body part of the vehicle to be aligned with the front part. In some embodiments, the behavior determination engine 224 may determine the vehicle adjustment based on various applicable criteria, such as a current location (e.g., flat or steep roads, curvy or straight roads), traffic conditions (e.g., congestion, speed limits, number of traffic signals, etc.), weather conditions, environmental conditions (e.g., time, brightness, etc.), etc.

The positioning engine 206 may determine a relative position of the edge relative to the front part. For example, the positioning engine 206 may determine angle of deviation of the edge of the body part relative to the front part or the sensor located at the front part. In some embodiments, the positioning engine 206 may also determine locations of the relevant objects. For example, the positioning engine may locate an object within the field of interest of the edge, and determine a distance between the object and the edge.

In some embodiments, the positioning engine 206 may determine a driving curve when a vehicle is making a turn at a traffic intersection. The positioning engine 206 may predict a turning curve when the vehicle is making a turn, and determine an expected range of the turning curve. If the edge of the body part is outside the expected range of the turning curve, the system may be alerted to make an adjustment, making the body part of the vehicle stay in the expected range of the driving curve when making a turn at the traffic intersection.

The analysis engine 204 may be configured to determine whether the body part of the vehicle is deviated. The determining may be based on a result of parameter(s) of the edge of the body part within the expected location range relative to the front part. The determining may also be based on a result of parameters(s) of one or more objects within a field of interest of the edge. The determining may be based on determined parameter(s) or based on historical data. In some embodiments, the data of the edge may be processed and analyzed to determine a parameter of the deviated body part. The parameter may be indicative of LiDAR point number distribution.

Historical data may refer to, as an example, specific features of the image. The historical data may be captured at a specific location. Historical data may be information already verified to be accurate. Historical data may be computed as angle data from sensors and/or onboard 3D or 2D map data. The historical data may be processed and analyzed to determine a known parameter of the edge of the body part. For example, the known parameter of the edge may be zero degree (e.g., when the body part is aligned with the front part of the vehicle).

In some embodiments, the analysis engine 204 may determine a difference between the determined parameter and the known parameter. If the difference between the determined parameter and the known parameter exceeds a first threshold, the analysis engine 204 may determine that the body part is deviated from the vehicle's driving direction. In some embodiments, if the difference between the determined parameter and the known parameter is below a second threshold, the analysis engine may determine that adjustment of the vehicle's body part is not required.

The analysis engine 204 may adjust the known parameter by a compensation factor based on a time of day, an amount of ambient light, or an environment condition. For example, the analysis engine 204 may adjust the known parameter to account for the fact that the vehicle is operating at night, while the known parameter may have been taken during the daytime. In some embodiments, the analysis engine 204 may refer to a lookup table of the known parameter or a lookup table of the historical data. The lookup table may be stored in memory (e.g., sensor system datastore 210). The lookup table may comprise values of the known parameter or images of the historical data based on different times of day, an environment condition (e.g., traffic, weather, road condition). The lookup table may also include information of makes or model numbers of various body part of the vehicles (e.g. various model numbers of trailers). The analysis engine 204 may determine whether the edge of the body part is within the expected location range between the determined parameter and the known parameter based on the make or model of trailer (i.e. body part). The analysis engine 204 may also analyze the distance between the edge and objects within the adjustment threshold distance of the edge.

The communication engine 208 may function to send requests, transmit and, receive communications, and/or otherwise provide communication with one or a plurality of systems. In some embodiments, the communication engine 208 may function to encrypt and decrypt communications. The communication engine 208 may function to send requests to and receive data from one or more systems through a network or a portion of a network. Depending upon implementation-specified considerations, the sensor communication engine 208 may send requests and receive data through a connection, all or a portion of which may be a wireless connection. The sensor communication engine 208 may request and receive messages, and/or other communications from associated systems.

Communications may be stored at least temporarily (e.g., cached and/or persistently) in the sensor system datastore 210. For example, the lookup table may be stored in the sensor system datastore 210. As another example, the historical data, the known parameters, and/or thresholds (e.g., first threshold, second threshold, third threshold, fourth threshold) may be stored in the sensor system datastore 210. The models or makes of the different trailers (i.e. body parts of the vehicle) may also be stored in the sensor system datastore 210. In some embodiments, the sensor system datastore 210 may be a memory.

Figure 3:
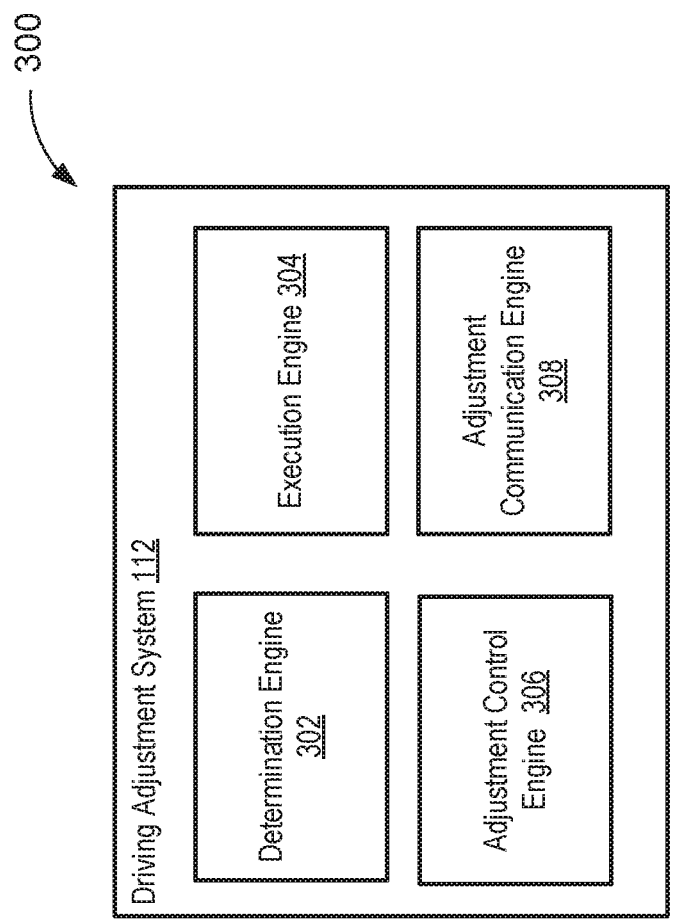
FIG. 3 depicts a diagram of an example of a driving adjustment system, in accordance with some embodiments

FIG. 3 illustrates a diagram of an example of a driving adjustment system 112 in accordance with some embodiments. In the example of FIG. 3, the driving adjustment system 112 may include a determination engine 302, an adjustment control engine 306, an execution engine 304, and an adjustment communication engine 308.

The determination engine 302 may function to determine which driving adjustment method or sequence of methods to perform. The determination engine 302 may select an adjustment method or combination of methods that consumes a minimum system load on the driving adjustment system, or the overall system. In some embodiments, the determination engine 302 may select an adjustment driving method(s) based on environment conditions (e.g., road conditions, weather conditions, a density of objects surrounding the vehicle) In some embodiments, the determination engine 302 may select an adjustment method based on information of makes or models of the body part stored in memory (e.g., system datastore 210). In some embodiments, the determination engine 302 may select an adjustment method based on the relative location of the edge. For example, when the edge detection system 108 determines that the body part is deviated from the front part and one or more objects surrounding the vehicle may be collided with the body part, the determination engine 302 may select an adjustment method to immediately adjust the body part of the vehicle.

In some embodiments, in response to the body part being deviated from the front part or the front part's driving direction, the determination engine 302 may determine whether the vehicle requires immediate adjustment. For example, the body part of the vehicle may require immediate adjustment if the determination engine 302 determines that the objects surrounding the vehicle may be immediately collided with the deviated body part. In such situation, the determination engine 302 may send a message to the execution engine 304 to execute adjustment for the body part of the vehicle. In some embodiments, the determination engine 302 may wait to notify the execution engine 304 to adjust the vehicle when the situation is not urgent or when a required load on the driving adjustment system 112 would be lower than a current required load. For example, if the system receive a notification of adjustment, and the vehicle is driving on a road without any surrounding objects, the determination engine 302 may send an adjustment notification when in more optimized conditions (e.g., on flat road condition).

The execution engine 304 may be configured to perform the driving adjustment methods as determined by the determination engine 302. In some embodiments, the execution engine 304 may be configured to adjust the body part of the vehicle based on angle of deviation of the edge relative to the front part. For example, the execution engine 304 may be configured to adjust the angle of deviation of the edge of the body part to zero degree relative to the front part.

The adjustment control engine 306 may function to control the determination engine 302 or the execution engine 304. More specifically, the adjustment control engine 306 may function to control one or more components of the determination engine 302 or the execution engine 304.

Figure 4:
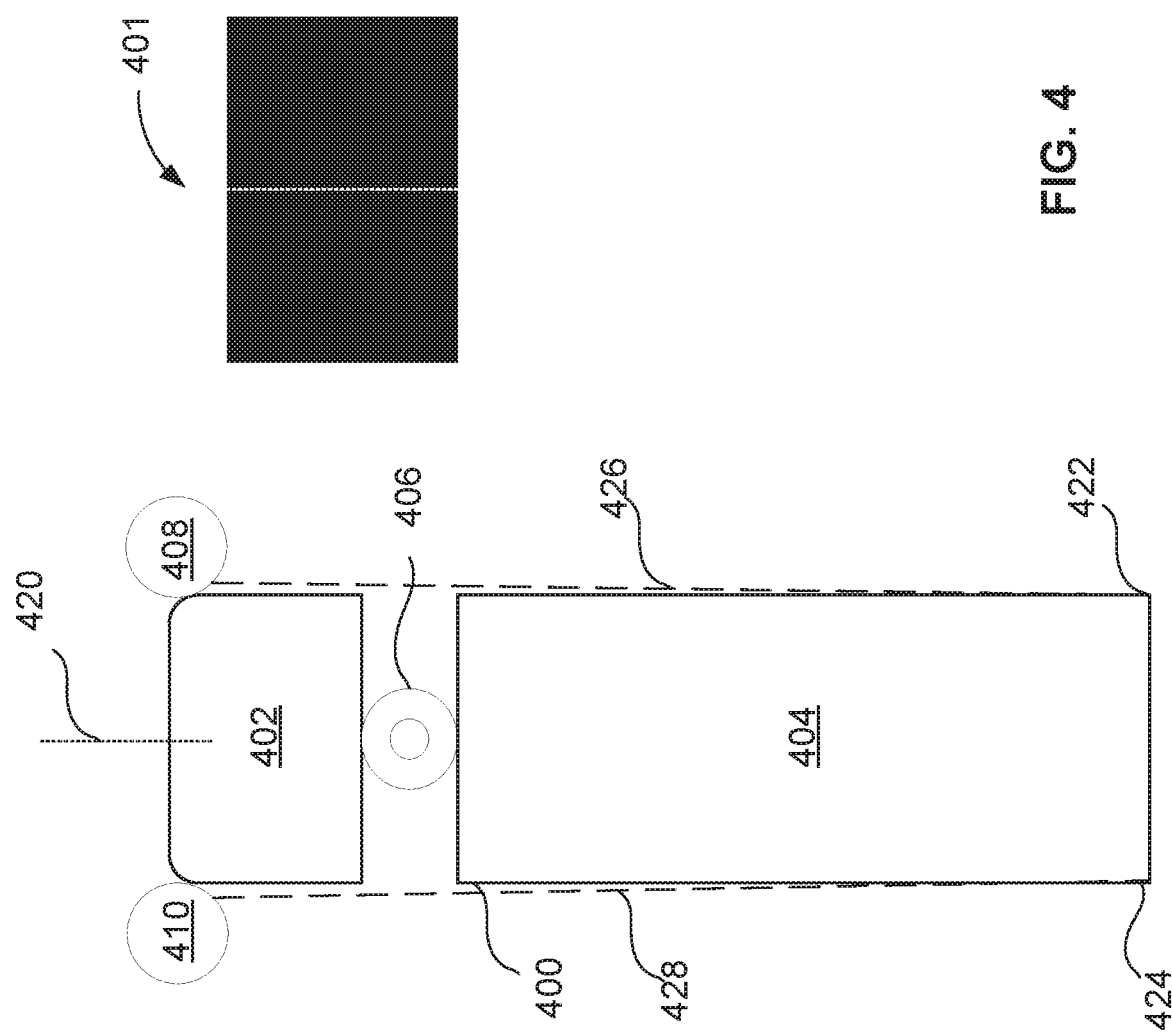
FIG. 4 depicts diagram of driving adjustment of a vehicle based on the edge detection system, in accordance with some embodiments.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems through a network or a portion of a network. Depending upon implementation-specified considerations, the sensor communication engine 308 may send requests and receive data through a connection, all or a portion of which may be a wireless connection. The sensor communication engine 308 may request and receive messages, and/or other communications from associated systems FIG. 4 illustrates a diagram of a vehicle 400 in response to an edge detection system 108, in accordance with some embodiments. The vehicle (i.e. truck) may have a front part (e.g., tractor) 402 and a body part (e.g., trailer) 404, and a connector 406. The body part 404 may include an edge of a left side 424 (i.e. left edge) and an edge of a right side 422 (i.e. right edge). The edge detection system 108 may be included in a sensor 410 coupled to a left side of the front part 402, and a sensor 408 coupled to a right side of the front part 402. The sensors 410, 408 may respectively detect the left edge 424 and the right edge 422 of the body part 404. The data of the edge 428, 426 captured by the sensors 410, 408 may be processed to 2D data 401. As shown in FIG. 4, when the body part 404 of the vehicle 400 is aligned with the front part 402 or aligned with the vehicle's driving direction, the system may not be able to process the data 428, 426 of the edge 424, 422 of the body part 404 respectively. Therefore, since the angle of deviation 428, 426 the edge 424, 422 of the body part 404 relative to the front part is zero degree (or within an expected location range, e.g., below 10 degree), no data of the edge may be processed in the edge detection system 108.

Figure 5:
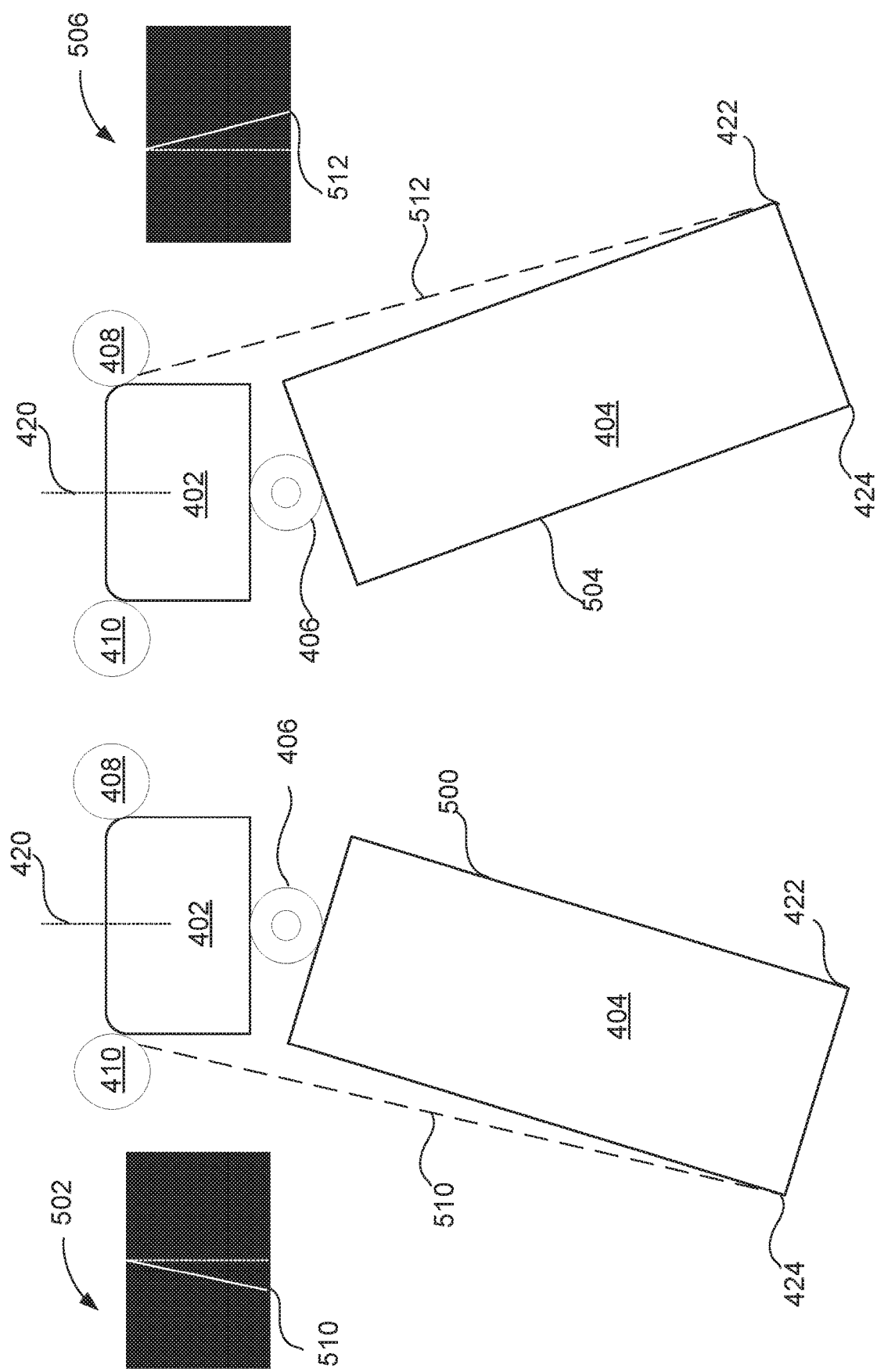
FIG. 5A-B depicts diagrams of angle adjustment of a vehicle based on the edge detection system, in accordance with some embodiments.

FIG. 5A and FIG. 5B illustrate a diagram when the body part 404 of the vehicle 500 is not aligned with the front part 402. Data of the left edge 424 may be processed as 2D data 502, and data of the right edge 422 may be processed as 2D data 506. As shown in FIG. 5A, when the body part 404 is not aligned with the front part 402 and the relative location of the left edge 424 of the body part 404 is outside an expected location range (e.g., angle of deviation of the edge 424 relative to the front part 402 is above 10 degree), the data of the left edge may be captured by the sensor 410 installed at the left side of the front part 402. The data may be processed to 2D data 502, showing angle of deviation 510 of the edge 424 relative to the front part 402 (or the front part's driving direction 420). As another example, as shown in FIG. 5B, when the body part 404 is not aligned with the front part 402 and the relative location of the edge 422 at the right side of the body part 404 is outside the expected location range (e.g., angle of deviation of the edge 422 relative to the front part 402 is above 10 degree), the data of the right edge 422 may be captured by the sensor 408 installed at the right side of the front part. The data may be processed to 2D data 506, showing angle of deviation 512 of the edge 422 relative to the front part 402 (or the front part's driving direction 420). The edge detection system 108 may calculate the location of the edge relative to the front part 402. In some embodiments, when the edge detection system 108 determines that the edge of the body part 404 is within an expected location range, the system 108 may not send notification for driving adjustment. In some embodiments, the system 108 may only process the data of the edge 424, 422. Irrelevant data, including data corresponding to irrelevant objects below or above the body part 404, or objects outside a field of interest (e.g., above 5 feet from the edge 424, 422), may be removed from the system 108 to minimize the system 108 loads.

Figure 6:
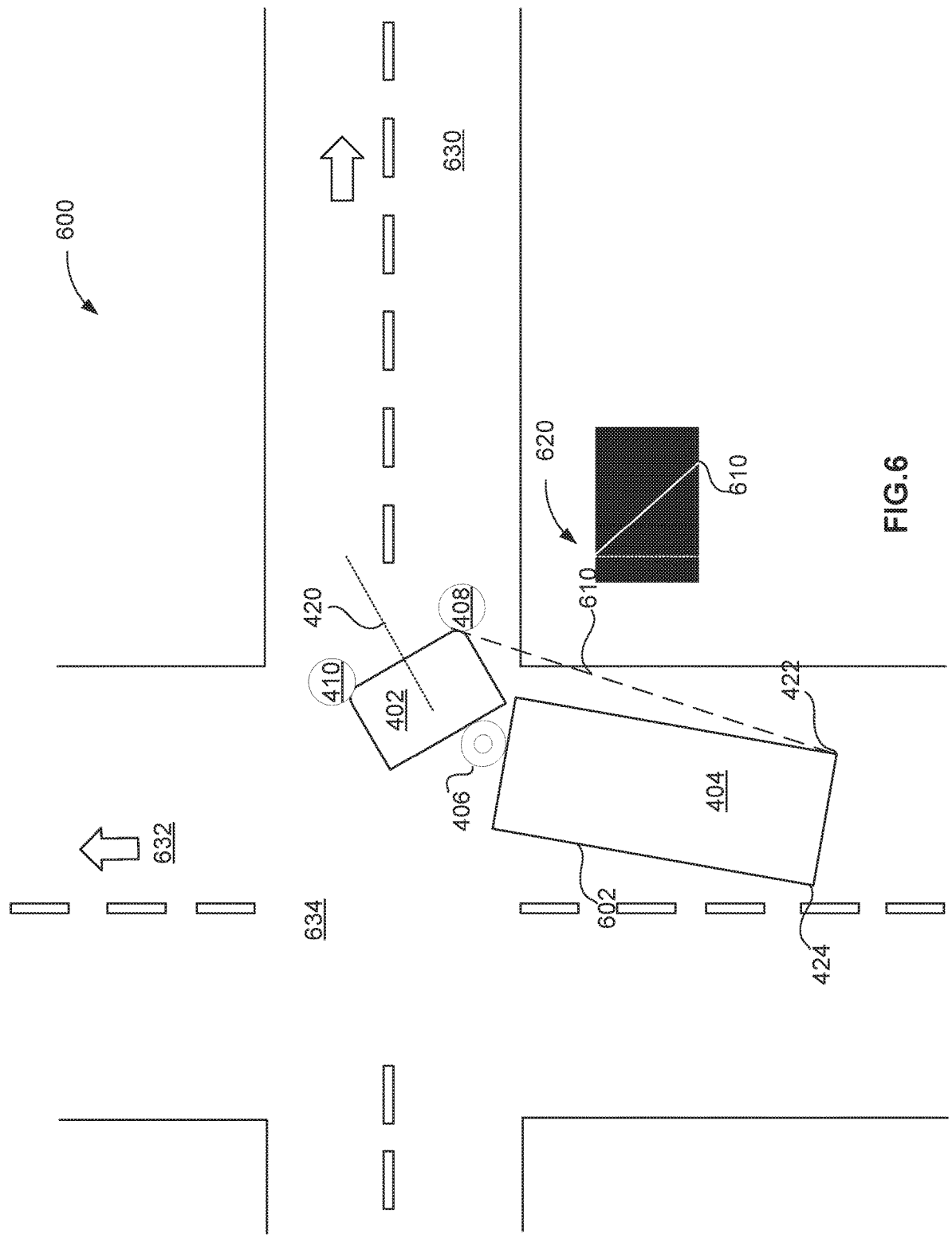
FIG. 6 depicts an example scenario for driving adjustment of a vehicle based on the edge detection system, in accordance with some embodiments.

FIG. 6 illustrates an example scenario 600 of a driving adjustment system of a vehicle, in accordance with some embodiments. The scenario 600 illustrates a vehicle 602 is at a traffic intersection 634 on the road 632. At the traffic intersection 634, the vehicle 602 is making a right turn to a road 630. In some embodiments, the edge detection system 108 may be configured to not receive or analyze one of two set of data from the sensor 410 or the sensor 408 when the vehicle 602 is making a right or a left turn. As shown in FIG. 6, when the vehicle 602 is making a right turn, the system 108 may not receive the data of the left edge 424 of the body part 404. For example, when the vehicle is making a right turn, the system 108 may not analyze the data of the left edge 424 of the body part 404. In such case, when the vehicle 602 is making a right turn, the system 108 may only receive and analyze the data captured by the sensor 408 installed at the right side of the front part 402.

In some embodiments, as shown in FIG. 6, the system 108 may be configured to calculate a location of the right edge 422 relative to the front part 402 based on the second set of the sensor data 610. If the system 108 determines that the relative location of the edge 422 is below a third adjustment threshold, the data may not be analyzed and may be removed from the system 108. For example, as shown in FIG. 4, when the angle of deviation of the right edge 422 is below 10 degree, the system 108 may determine that adjustment of the body part 404 is not required. If the system 108 determines that the relative location of the right edge 422 is above a fourth adjustment threshold, the adjustment of the body part 404 may also not be required. For example, as shown in FIG. 6, when the angle of deviation of the right edge 422 relative to the front part 402 is equal or above 45 degree (i.e. the data 620 shows the angle of deviation is equal or above 45 degree), the system 108 may determine that the vehicle 602 is making a right turn and will not send an adjustment notification. Therefore, if the system 108 determines that the relative location of the edge below the third adjustment threshold or above the fourth adjustment threshold, the adjustment of the vehicle may not be required.

Figure 7:
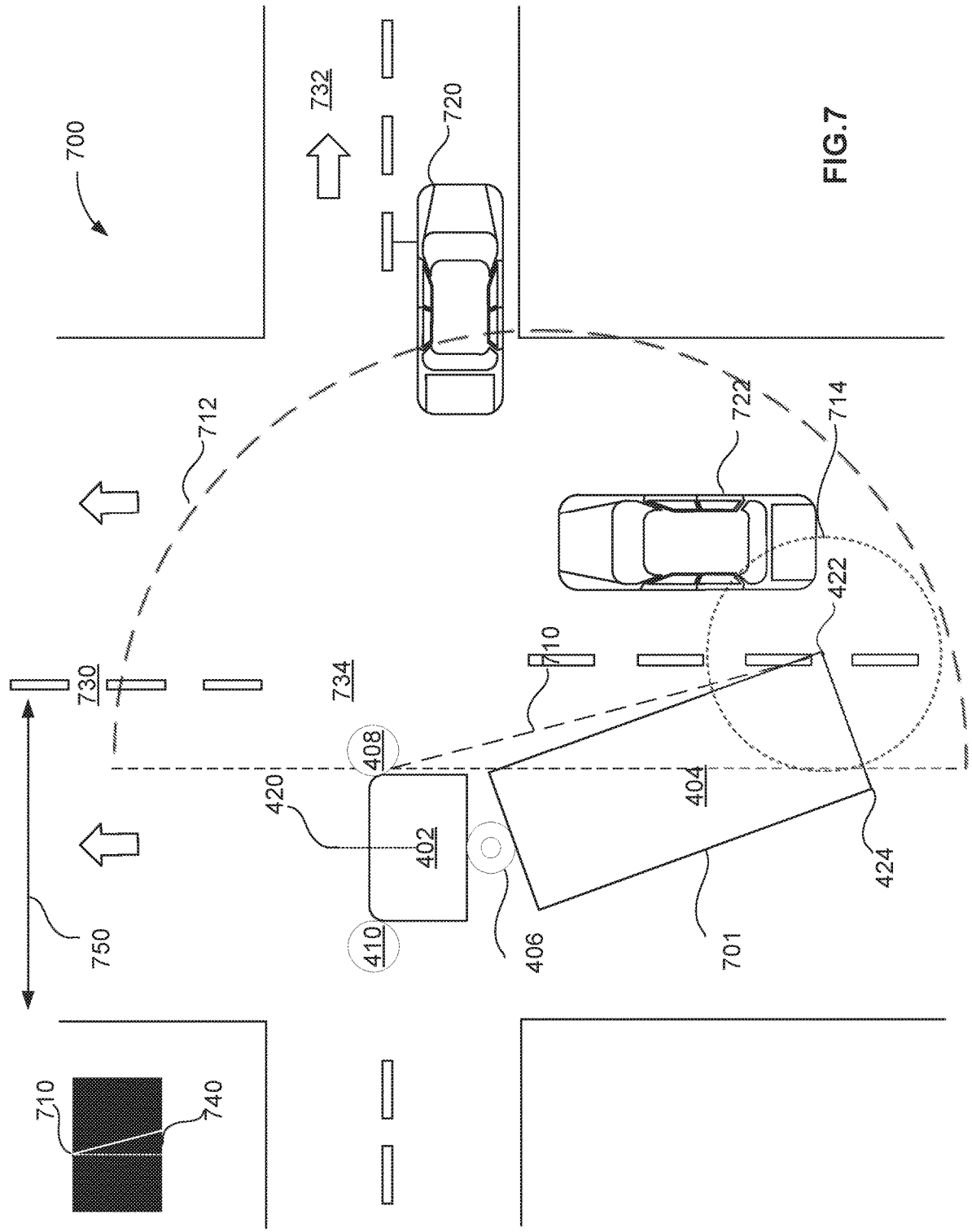
FIG. 7 depicts an example scenario for driving adjustment of a vehicle based on the edge detection system, in accordance with some embodiments.

FIG. 7 illustrates an example scenario 700 of a driving adjustment of a vehicle 701, in accordance with some embodiments. The scenario 700 may include a sensor 408 installed on the right side of the front part 402 of the vehicle 701. The sensor 408 may have a coverage area 712 nearby the right side of the vehicle (covering an area 712). The edge detection system 108 may determine a field of interest 714 centered on the right edge 422 of the body part. The field of interest 714 may be a range of locations relative to the edge 422 of the body part 404. The system 108 may be configured to detect and record the field of interest 714. The record of the field of interest 714 may be maintained in the system 108 until the body part 404 is detached from the front part 402. For example, the system 108 may detect and record the field of interest 714 of the body part 404 in the scenario 700. The field of interest 714 may be different based on makes or model numbers of the trailer or the body part 404. When a new body part is attached to the front part 402, the system may clear the record of the previous field of interest, and may be configured to record a new field of interest of the body part. The system 108 may also be configured to detect one or more objects within the field of interest (covering an area 714).

The edge detection system 108 may filter and remove objects outside the field of interest. For example, though the sensor 408 can detect objects within the area 712, the edge detection system 108 may be configured to remove data of a vehicle 720 because the vehicle 720 is not within the field of interest. As another example, the system 108 may be configured to process a data of a vehicle 722 because the vehicle 722 is within the field of interest 714 such that the vehicle 722 may be collided with the deviated right edge 422, as shown in FIG. 7. The field of interest 422 may be a distance surrounding the edge of the body part (i.e., adjustment threshold distance). For example, the system 108 may determine the adjustment threshold distance 714 is 5 feet away from the right edge 422. If the system determines that the vehicle 722 is less than 5 feet away from the right edge 422, the angle adjustment system may adjust the body part 404 to be aligned with the front part 402.

The system may also determine the field of interest 714 of the body part based on width of lanes 750. The adjustment threshold distance from the edge of the body part may be larger when the vehicle is driving on a wider lane of the road 730 than on a narrower lane of the road. For example, when the vehicle is driving on a wider lane, the adjustment threshold distance may be 5 feet from the edges 422, 422 of the body part 404. However, if the vehicle is driving on a narrower lane, the adjustment threshold distance may be 3 feet from the edges 422, 424 of the body part.

In some embodiments, the system 108 may only process the data of the left edge 424 or the right edge 422 of the body part 404, to minimize the system loads. For example, as shown in FIG. 7, though the sensor 408 may capture the vehicle 722 and the right edge 422 of the body part 404, the system 108 may filter data of the vehicle 722 and process data of the right edge. The system may extract the data of the edge (e.g. information of the angle of the edge relative to the front part) and process the data (i.e. 3D LiDAR data) to 2D image 740. The 2D image 740 processed by the edge detection system 108 may include angle of deviation of the right edge 422 relative to the front part 402.

Figure 8:
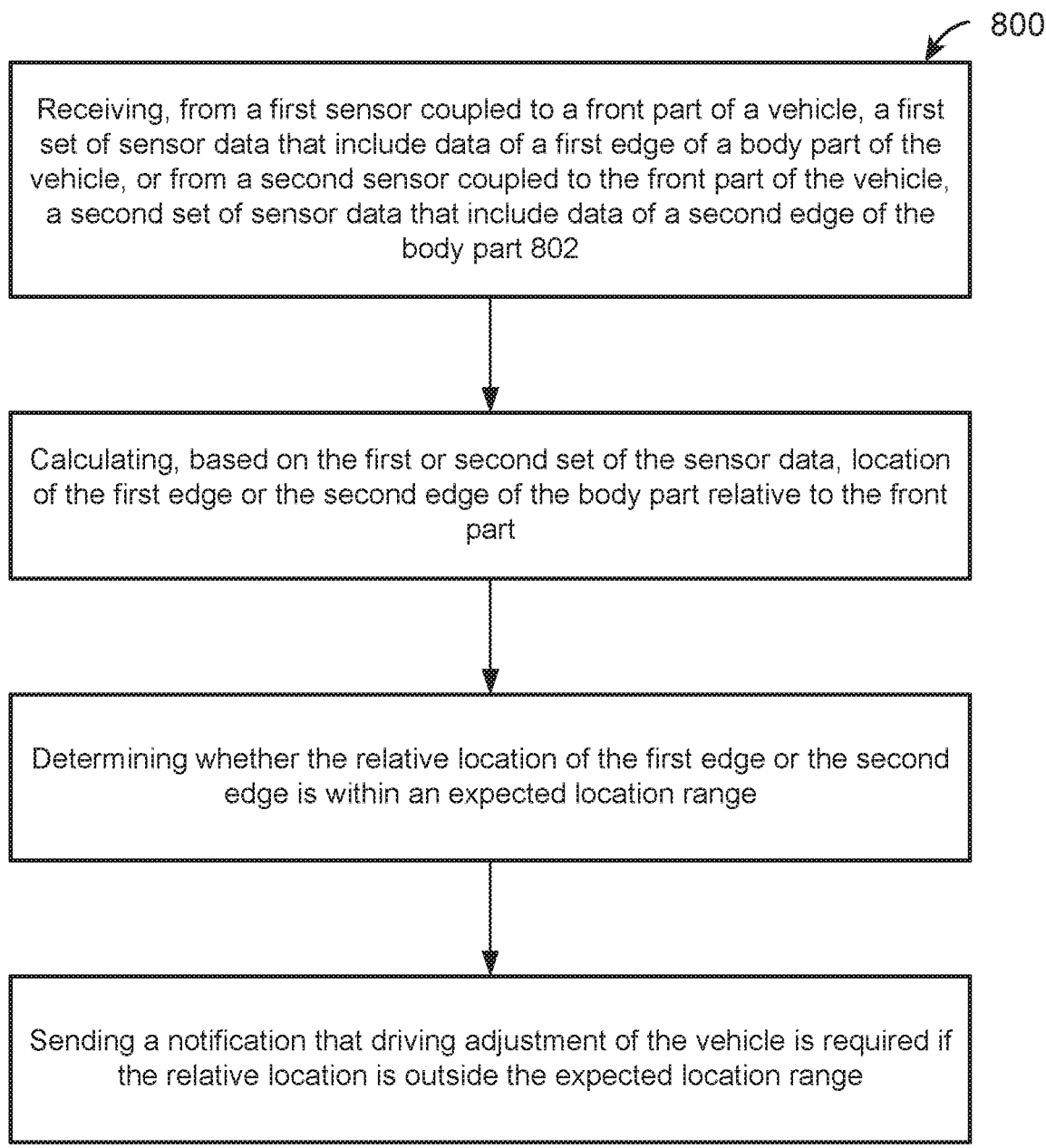
FIG. 8 depicts a flowchart of an example of an example method, in accordance with some embodiments.

FIG. 8 illustrates a flowchart 800 of an example of a method for driving adjustment. In this and other flow flowcharts, the flowchart 800 illustrates by way of examples a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. is also applicable to FIG. 8. The example method 800 may be implemented in various computing systems or devices including one or more processors.

In step 802, a system may receive, from a sensor coupled to a left side at a front part of a vehicle, a first set of sensor data that include data of a left edge of a body part, or from a sensor coupled to a right side of the front part, a second set of sensor data that include data of a right edge of the body part. In step 804, the system may calculate, based on the first or second set of the sensor data, location of the left or right edge of the body part relative to the front part. In step 806, the system may determine whether the relative location of the edge is within an expected location range. In step 808, the system may send a notification that driving adjustment of the vehicle is required if the relative location is outside the expected location range.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
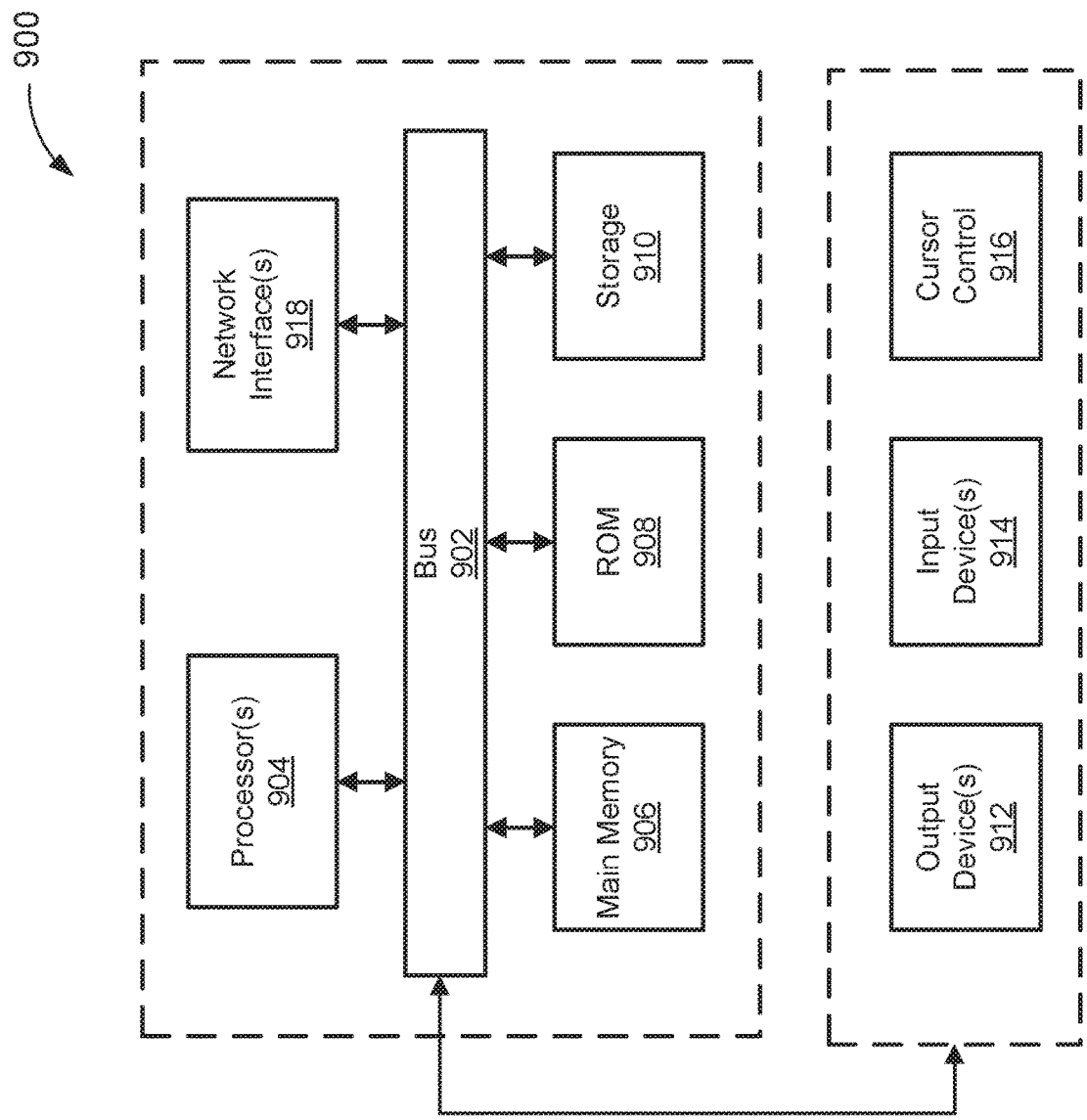
FIG. 9 depicts a diagram of an example computer system for implementing the features disclosed herein.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to output device(s) 912, such as a cathode ray tube (CRT) or LCD display (or touch screen), for displaying information to a computer user. Input device(s) 914, including alphanumeric and other keys, are coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system comprising:
    one or more processors, and
    a memory storing instructions that, when executed by the one or more processors, cause the system to perform:
        receiving, from a first sensor at a front part of a vehicle, a first set of sensor data corresponding to a first edge of a body part of the vehicle, and from a second sensor at the front part of the vehicle, a second set of sensor data corresponding to a second edge of the body part;
        calculating, based on the first set or the second set of the sensor data, a first location of the first edge or the second edge of the body part relative to the front part;
        determining whether an angle of deviation between the first edge or the second edge is within a threshold angle;
        sending a notification that driving adjustment of the vehicle is required if the angle of deviation is outside of the threshold angle;
        in response to determining that objects within a field of interest are nonexistent, waiting until a flat road condition to send the notification, wherein the field of interest is associated with the first sensor or the second sensor and based on a width of a lane on which the vehicle is driving;
        capturing, using the first sensor or the second sensor, any objects that are at least partially within the field of interest; and
        adjusting the vehicle to avoid the any captured objects.

2. The system of claim 1, wherein the first set or the second set of the sensor data are processed to remove at least part of data corresponding to any objects above the first or second edge of the body part.

3. The system of claim 2, wherein the first set or the second set of the sensor data are further processed to remove at least part of data corresponding to any objects below the first or second edge of the body part.

4. The system of claim 1, wherein the first set or the second set of the sensor data are processed to remove at least part of data corresponding to any objects outside a range of possible relative locations of the first or second edge.

5. The system of claim 4, wherein the system is further configured to:
detect and record respective distances between:
the front part of the vehicle and a location of the first edge, and
between the front part of the vehicle and a location of the second edge, or
detect and record relative locations of the first edge, the second edge, and the front part of the vehicle.

6. The system of claim 4, wherein the range of possible relative locations are provided in data source that identifies the range based on a make or model number of the body part.

7. The system of claim 1, wherein the system is further configured to filter the sensor data corresponding to any objects at one or more positions other than the first edge or the second edge of the body part.

8. The system of claim 1, wherein the first sensor is disposed on a left side of the front part and the second sensor is disposed on a right side of the front part.

9. The system of claim 8, wherein the system is configured to not receive or analyze the second set of sensor data when the vehicle is making a left turn, or not receive or analyze the first set of sensor data when the vehicle is making a right turn.

10. The system of claim 1, wherein the first sensor and the second sensor each is a LiDAR.

11. The system of claim 1, wherein the field of interest is centered at a rear left edge or a rear right edge of the vehicle.

12. The system of claim 11, wherein a determination of whether the field of interest is centered at the rear left edge or the rear right edge is based on a relative orientation of a back of the truck compared to a front of the truck.

13. The system of claim 1, wherein the threshold angle comprises a first threshold angle; and the sending of the notification that driving adjustment of the vehicle is required is in response to the angle of deviation being between the first threshold angle and a second threshold angle larger than the first threshold angle, while refraining from sending the notification in response to the angle of deviation exceeding the second threshold angle.

14. The method comprising:
receiving, from a first sensor at a front part of a vehicle, a first set of sensor data corresponding to a first edge of a body part of the vehicle, and from a second sensor at the front part of the vehicle, a second set of sensor data corresponding to a second edge of the body part;
calculating, based on the first set or the second set of the sensor data, a first location of the first edge or the second edge of the body part relative to the front part;
determining whether an angle of deviation between the first edge or the second edge is within a threshold angle; and
sending a notification that driving adjustment of the vehicle is required if the angle of deviation is outside of the threshold angle;
in response to determining that objects within a field of interest are nonexistent, waiting until a flat road condition to send the notification, wherein the field of interest is associated with the first sensor or the second sensor and based on a width of a lane on which the vehicle is driving;
capturing, using the first sensor or the second sensor, any objects that are at least partially within the field of interest; and
adjusting the vehicle to avoid the any captured objects.

15. The method of claim 14, wherein the first sensor and the second sensor each is a LiDAR.

16. The method of claim 14, further comprising:
removing at least part of data corresponding to any objects above the first edge or the second edge of the body part; and
removing at least part of data corresponding to any objects below the first edge or the second edge of the body part.

17. The method of claim 14, further comprising:
filtering the sensor data corresponding to any objects at one or more positions other than the first edge or the second edge of the body part.

18. The method of claim 14, further comprising:
detecting one or more objects that may collide with the body part of the vehicle.

19. The method of claim 18, further comprising:
sending a command to a driving control module of the vehicle to adjust driving to avoid the collision.

20. A system comprising:
one or more processors, and
a memory storing instructions that, when executed by the one or more processors, cause the system to perform:
receiving, from a first sensor at a front part of a vehicle, a first set of sensor data corresponding to a first edge of a body part of the vehicle, and from a second sensor at the front part of the vehicle, a second set of sensor data corresponding to a second edge of the body part;
calculating, based on the first set or the second set of the sensor data, a first location of the first edge or the second edge of the body part relative to the front part;
determining whether an angle of deviation between the first edge or the second edge is within a threshold angle, wherein the threshold angle comprises a first threshold angle;
sending a notification that driving adjustment of the vehicle is required in response to the angle of deviation being between the first threshold angle and a second threshold angle larger than the first threshold angle, while refraining from sending the notification in response to the angle of deviation exceeding the second threshold angle;
determining a field of interest associated with the first sensor or the second sensor based on a width of a lane on which the vehicle is driving;
capturing, using the first sensor or the second sensor, any objects that are at least partially within the field of interest; and
adjusting the vehicle to avoid the any captured objects.

* * * * *